(12) United States Patent
Rajpathak et al.

(10) Patent No.: US 12,476,785 B2
(45) Date of Patent: Nov. 18, 2025

(54) LOW POWER AND AREA CLOCK MONITORING CIRCUIT USING RING DELAY ARRANGEMENT FOR CLOCK SIGNAL HAVING PHASE-TO-PHASE VARIATION

(71) Applicant: NVIDIA Corporation, Santa Clara, CA (US)

(72) Inventors: Kedar Rajpathak, Santa Clara, CA (US); Tezaswi Raja, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 253 days.

(21) Appl. No.: 18/295,537

(22) Filed: Apr. 4, 2023

(65) Prior Publication Data
US 2024/0340157 A1    Oct. 10, 2024

(51) Int. Cl.
*H04L 7/033* (2006.01)
*H04L 7/00* (2006.01)

(52) U.S. Cl.
CPC .......... *H04L 7/0331* (2013.01); *H04L 7/0008* (2013.01); *H04L 7/0337* (2013.01)

(58) Field of Classification Search
CPC .... H04L 7/0331; H04L 7/0008; H04L 7/0337
USPC ......................................................... 713/500
See application file for complete search history.

(56) References Cited

U.S. PATENT DOCUMENTS

| | | | | |
|---|---|---|---|---|
| 3,329,831 A * | 7/1967 | Abramson | ............ | H04M 19/02 377/122 |
| 3,972,320 A * | 8/1976 | Kalman | .................... | A61B 5/08 128/903 |
| 4,696,019 A * | 9/1987 | Tulpule | ................. | G06F 11/187 327/145 |
| 5,497,110 A * | 3/1996 | Smith | .................... | G01R 31/42 331/DIG. 2 |
| 6,466,520 B1 * | 10/2002 | Speyer | ............... | G01R 31/2882 368/118 |
| 6,895,525 B1 * | 5/2005 | Wilkie | ...................... | H03L 7/16 714/48 |
| 7,242,223 B1 * | 7/2007 | Alon | .................... | G04D 7/1207 327/39 |
| 2002/0029117 A1 * | 3/2002 | Ito | ............................. | G06F 1/12 702/79 |
| 2003/0154043 A1 * | 8/2003 | Singh | ............... | G01R 31/31937 702/79 |

(Continued)

*Primary Examiner* — Paul R. Myers

(57) ABSTRACT

Circuitry and method of operating a circuit for monitoring a clock signal having phase-to-phase variation is disclosed. The method comprises adding a fixed number of bits to a pulse count of a reference phase instance for a high or low phase to yield a modified added pulse count when detecting a clock slow abnormality, subtracting the fixed number of bits from the pulse count of the reference phase instance to yield a modified subtracted pulse count when detecting a clock fast abnormality, comparing the modified added pulse count to a pulse count for an immediately subsequent phase instance of the high or low phase count of the clock signal when detecting the clock slow abnormality, and comparing the modified subtracted pulse count to the pulse count for the immediately subsequent phase instance of the high phase or low phase count of the clock signal when detecting the clock fast abnormality.

23 Claims, 14 Drawing Sheets

(56) References Cited

U.S. PATENT DOCUMENTS

| | | | |
|---|---|---|---|
| 2006/0132190 A1* | 6/2006 | Driediger | G01R 23/10 327/47 |
| 2007/0046348 A1* | 3/2007 | Liu | H03L 7/0814 327/158 |
| 2013/0222068 A1* | 8/2013 | Yoshimura | G01R 31/31727 331/44 |
| 2014/0035560 A1* | 2/2014 | Olmos | G06F 1/14 324/76.41 |
| 2019/0130666 A1* | 5/2019 | Matsuura | H03K 21/02 |
| 2021/0391864 A1* | 12/2021 | Rafi | H03L 7/0992 |
| 2023/0324460 A1* | 10/2023 | Liao | G01R 31/31727 714/731 |
| 2024/0160520 A1* | 5/2024 | Oak | G06F 11/1604 |

\* cited by examiner

LOW POWER AND AREA CLOCK MONITORING CIRCUIT USING RING DELAY ARRANGEMENT FOR CLOCK SIGNAL HAVING PHASE-TO-PHASE VARIATION

TECHNICAL FIELD

This application is directed, in general, to monitoring clock signals and, more specifically, to detecting abnormalities in those clock signals.

BACKGROUND

Most digital systems rely on a clock signal in order to function. For example, virtually all modern computing platforms—such as, e.g., mobile devices, desktop computers, and rack-mounted compute nodes in data centers—depend on a system clock signal to execute instructions that enable them to perform their intended functions.

A typical system clock signal can be generated by a circuit that includes a quartz crystal to ensure very accurate and stable oscillations. When properly functioning, the clock signal oscillates between two opposite state phases corresponding, respectively, to a "high" voltage level (e.g., a "high" state or a "high" phase) and a "low" voltage level (e.g., a "low" state or a "low" phase). Usually a clock signal oscillates at a fixed clock frequency, in which a single oscillation cycle corresponds to a fixed clock period having a duration that depends on the fixed clock frequency and includes both the high phase and low phase. In most digital systems, the clock signal is designed to oscillate with a 50% duty cycle. That is, during each clock cycle, the clock signal is designed to exhibit a stable high phase for one half of the clock period and a stable low phase for the other half of the clock period. These states repeat in a strictly alternating fashion from one clock cycle to the next. In some digital systems, the clock signal may be designed to oscillate with a duty cycle other than 50%.

In any such digital systems, one type of clock abnormality occurs when the clock stops oscillating entirely (e.g., a clock "stop"). Another type of clock abnormality occurs when the clock exhibits a duty cycle other than the expected duty cycle (e.g., a clock "glitch"). Other clock abnormalities occur, e.g., when a clock cycle is missed or when the clock frequency increases or decreases. Any of these clock abnormalities can be cause for concern in a digital system because their occurrence may cause the digital system to behave unexpectedly. These abnormalities can occur naturally, e.g., influenced by physical phenomena impingement on the clock signals. Additionally, these abnormalities can occur as a result of a malicious intended alteration of the clock signals which create vulnerabilities to security attacks that are designed to exploit the clock timing of the digital system.

It is desirable, therefore, to detect clock abnormalities if and when they occur and to respond to them quickly.

SUMMARY

In one aspect, a clock monitoring circuit for monitoring a clock signal having phase-to-phase variation is disclosed. In one embodiment, the clock monitoring circuit comprises a binary adder, a binary subtractor, a first comparator, and a second comparator. The binary adder is configured to add a fixed number of tune bits to a pulse count of a reference phase instance for a selected one of a high phase count or low phase count of the clock signal to yield a modified added pulse count for the reference phase instance when detecting a clock slow clock abnormality. The binary subtractor is configured to subtract the fixed number of tune bits from the pulse count of the reference phase instance for the selected one of the high phase count or low phase count of the clock signal to yield a modified subtracted pulse count for the reference phase instance when detecting a clock fast clock abnormality. The first comparator is configured to compare the modified added pulse count to a pulse count for an immediately subsequent phase instance of the selected one of the high phase count or low phase count of the clock signal when detecting the clock slow clock abnormality. The second comparator is configured to compare the modified subtracted pulse count to the pulse count for the immediately subsequent phase instance of the selected one of the high phase count or low phase count of the clock signal when detecting the clock fast clock abnormality.

In another aspect, an integrated circuit (IC) is disclosed. The IC comprises at least one processing subsystem and at least one clock monitoring circuit for monitoring a clock signal having phase-to-phase variation coupled to the at least one processing subsystem and a clock signal externally generated from the IC or a plurality of clock signals generated internal to the IC. The at least one clock monitoring circuit comprises a binary adder, a binary subtractor, a first comparator, and a second comparator. The binary adder is configured to add a fixed number of tune bits to a pulse count of a reference phase instance for a selected one of a high phase count or low phase count of the clock signal to yield a modified added pulse count for the reference phase instance when detecting a clock slow clock abnormality. The binary subtractor is configured to subtract the fixed number of tune bits from the pulse count of the reference phase instance for the selected one of the high phase count or low phase count of the clock signal to yield a modified subtracted pulse count for the reference phase instance when detecting a clock fast clock abnormality. The first comparator is configured to compare the modified added pulse count to a pulse count for an immediately subsequent phase instance of the selected one of the high phase count or low phase count of the clock signal when detecting the clock slow clock abnormality. The second comparator is configured to compare the modified subtracted pulse count to the pulse count for the immediately subsequent phase instance of the selected one of the high phase count or low phase count of the clock signal when detecting the clock fast clock abnormality.

In another aspect, a method of operating a clock monitoring circuit for monitoring a clock signal having phase-to-phase variation is disclosed. The method comprises adding a fixed number of tune bits to a pulse count of a reference phase instance for a selected one of a high phase count or low phase count of the clock signal to yield a modified added pulse count for the reference phase instance when detecting a clock slow clock abnormality, subtracting the fixed number of tune bits from the pulse count of the reference phase instance for the selected one of the high phase count or low phase count of the clock signal to yield a modified subtracted pulse count for the reference phase instance when detecting a clock fast clock abnormality, comparing the modified added pulse count to a pulse count for an immediately subsequent phase instance of the selected one of the high phase count or low phase count of the clock signal when detecting the clock slow clock abnormality, and comparing the modified subtracted pulse count to the pulse count for the immediately subsequent phase instance of the selected one of the high phase count or low phase count of the clock signal when detecting the clock fast clock abnormality.

In another aspect, a method of manufacturing an integrated circuit (IC) for monitoring a clock signal having phase-to-phase variation is disclosed. In one embodiment, the method comprises forming a binary adder, a binary subtractor, a first comparator, and a second comparator. The binary adder is configured to add a fixed number of tune bits to a pulse count of a reference phase instance for a selected one of a high phase count or low phase count of the clock signal to yield a modified added pulse count for the reference phase when detecting a clock slow clock abnormality. The binary subtractor is configured to subtract the fixed number of tune bits to the pulse count of the reference phase instance for the selected one of the high phase count or low phase count of the clock signal to yield a modified subtracted pulse count for the reference phase when detecting a clock fast clock abnormality. The first comparator is configured to compare the modified added pulse count to a pulse count for an immediately subsequent phase instance of the selected one of the high phase count or low phase count of the clock signal when detecting the clock slow clock abnormality. The second comparator is configured to compare the modified subtracted pulse count to the pulse count for the immediately subsequent phase instance of the selected one of the high phase count or low phase count of the clock signal when detecting the clock fast clock abnormality.

In another aspect, an autonomous machine is disclosed. The autonomous machine comprises at least one processing subsystem, and at least one clock monitoring circuit for monitoring a clock signal having phase-to-phase variation coupled to the at least one processing subsystem and an externally generated clock signal or a plurality of internally generated clock signals. The clock monitoring circuit comprises a binary adder, a binary subtractor, a first comparator, and a second comparator. The binary adder is configured to add a fixed number of tune bits to a pulse count of a reference phase instance for a selected one of a high phase count or low phase count of the clock signal to yield a modified added pulse count for the reference phase instance when detecting a clock slow clock abnormality. The binary subtractor is configured to subtract the fixed number of tune bits from the pulse count of the reference phase instance for the selected one of the high phase count or low phase count of the clock signal to yield a modified subtracted pulse count for the reference phase instance when detecting a clock fast clock abnormality. The first comparator is configured to compare the modified added pulse count to a pulse count for an immediately subsequent phase instance of the selected one of the high phase count or low phase count of the clock signal when detecting the clock slow clock abnormality. The second comparator is configured to compare the modified subtracted pulse count to the pulse count for the immediately subsequent phase instance of the selected one of the high phase count or low phase count of the clock signal when detecting the clock fast clock abnormality.

BRIEF DESCRIPTION OF THE DRAWINGS

Reference is now made to the following descriptions taken in conjunction with the accompanying drawings, in which.

DETAILED DESCRIPTION

Figure 1:
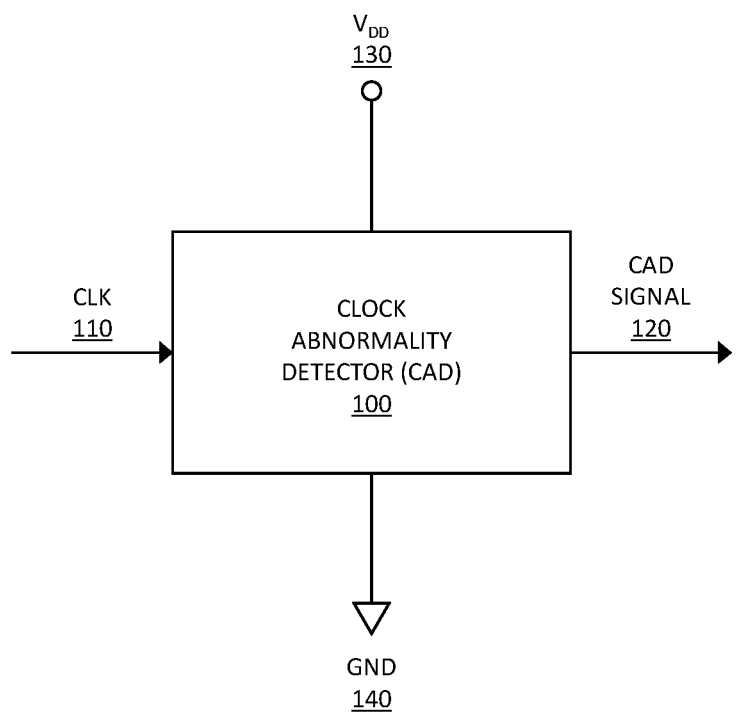
FIG. 1 illustrates an embodiment of a clock abnormality detector (CAD) in which at least a portion of the circuitry and methods disclosed herein can be implemented.

As noted above, most digital systems rely on a clock to provide at least one clock signal so that the digital systems, e.g., mobile devices, desktop computers, rack-mounted compute nodes in data centers, etc. execute instructions that enable them to perform their intended functions. Typically this clock consists of a circuit including a quartz crystal external to processors of the digital system. Additionally, a clock signal generated by this external circuit employing the quartz crystal can be used to internally generate a number of other clock signals for use by the processors of the digital system, e.g., by using phase-locked loop (PLL) circuits to generate PLL clocks used by the processors of the digital system. In most instances, a plurality of clock signals must be generated for the digital system.

In some cases, the external clock circuit can be physically accessed, allowing for manipulation of the clock signal generated by the external clock circuit. An entity, e.g., a hacker, can maliciously alter the clock signal thereby causing the above-noted clock abnormalities. As a result, the hacker can access the digital system by this malicious manipulation of the clock signal thereby creating security concerns for the digital system.

In other scenarios, the clock signals generated by the external circuit utilizing the quartz crystal and/or the internal clock signals, e.g., the PLL clocks generated by the internal PLLs, can be influenced by physical phenomena, e.g., gamma rays impinging on the clock signals which can cause the above-noted clock abnormalities, much like the hacker can cause the clock abnormalities as described above. In digital systems where safety is significantly important, the clock signals, either the externally generated clocks signals or the internally generated clock signals, such as the PLL clock signals, or both, must be verified to be free of any influence from natural phenomena influences. Examples of such digital systems where safety is significantly important are autonomous driving computing platforms, robotic systems, and autonomous vision computing platforms. In some cases various industry standards for clock signal integrity need to be met. For example, in autonomous driving applications, conformance to the ISO 26262 standard is required in many instances.

In at least both cases above, i.e., the security concerns to avoid malicious influence on clock signals input to digital systems and the safety concerns to avoid natural phenomena influence on clock signals externally provided to or internally generated by digital systems, monitoring of the clock signals is desired to determine if the clock signal is as expected or not, i.e., to detect the above-noted clock abnormalities, where the monitoring of the clock signal can yield an alert if there is a difference between a received clock signal and an expected clock signal. Further, it is desired that no false positive alerts are generated by the monitoring of the clock signals and that the monitoring of the clock signals is reliable, detecting the clock abnormalities in every instance. Additionally, it is necessary that the monitoring of each of the clock signals can be implemented using a very small area of silicon with a very low consumption of power and works without post-silicon tuning. And lastly, it would be advantageous that a same design for monitoring the clock signals can be effective over a broad range of operating frequencies, e.g., from about 32 kHz to over 800 MHz without significant alteration.

This disclosure provides a low power and area clock monitoring circuit using a ring delay arrangement, a system employing the circuit, a method of operating the circuit, and a method of manufacturing the circuit to monitor a clock signal for the above-noted clock abnormalities. The disclosed clock monitoring circuit takes up very little area of silicon, e.g., in some embodiments an area savings of up to 96% as compared to conventional clock monitoring circuits can be achieved with similar quality metrics. The disclosed clock monitoring circuit consumes very little power, e.g., in some embodiments a power savings of up to 50% as compared to conventional clock monitoring circuits can be achieved with similar quality metrics.

The disclosed low power and area clock monitoring circuit includes at least a pair ring pulse generators. Each of the ring pulse generators include a plurality of edge detectors. The edge detectors can be, e.g., conventional edge detector circuits. A clock signal, e.g., the external clock signal or one of the internal PLL clock signals disclosed above, is input to a first of the plurality of edge detectors of a first of the at least two ring pulse generators. An inverse of the clock signal is input to a first of the edge detectors of the second of the at least two ring pulse generators. These clock signals oscillate between two opposite state phases corresponding, e.g., to the "high" phase and a "low" phase disclosed above at a fixed clock frequency, in which a single oscillation cycle corresponds to a fixed clock period having a duration that depends on the fixed clock frequency and is the sum of a duration of the high phase and low phase of the two opposite state phases of the clock signal. In the first ring pulse generator, the first of the edge detectors generates a first pulse with a unit pulse width of a first pulse train upon detecting an edge of the clock signal input to the ring pulse generator where the edge of the clock signal input to the ring pulse generator is a falling edge or rising edge. The output of the first edge detector of the ring pulse generator is fed to a second edge detector of the first ring pulse generator, much like the clock signal input to the first edge detector of the first ring pulse generator.

As with the first edge detector, the second edge detector generates a pulse with the unit pulse width of a second pulse train upon detecting an edge received from the first edge detector. In some embodiments, the second (and subsequent) edge detector generates a pulse of differing pulse widths rather than the unit pulse width. Moreover, as with the first edge detector, the second edge detector generates its pulse upon detecting either a falling or rising edge. As with the first edge detector of the ring pulse generator, the output of the second edge detector of the ring pulse generator is fed to a third edge detector of the first ring pulse generator. The third edge detector generates a pulse with the unit pulse width or, in some embodiments, with a differing pulse width, of a third pulse train upon detecting an edge of the pulse from the second edge detector where the edge can be either a falling or rising edge.

At this point, the pulse generated by the third edge detector is fed back to the first edge detector, thereby implementing the ring delay arrangement, whereupon the first edge detector generates a subsequent pulse of the unit pulse width of the first pulse train upon detecting an edge of the pulse generated by the third edge detector fed back to the first edge detector. In some embodiments, the width of the subsequent pulse of first pulse train generated by the first edge detector is of a same pulse width as the first generated pulse or, in other embodiments, the subsequent pulse generated by the first edge detector is of a different pulse width from the first generated pulse width. The output of the first edge detector is input to the second edge detector to generate in a similar manner a subsequent pulse of the second pulse train and the output of the second edge detector is input to the third edge detector to generate in a similar manner a subsequent pulse of the third pulse train. Of course, while this example describes three edge detectors in the first ring pulse generator generating three separate pulse trains, the first ring pulse generator may include any number of edge detectors generating any number of separate pulse trains. This process continues until the first ring pulse generator detects another edge of the clock signal input to the ring pulse generator.

A detection resolution of the duration of either of the low or high phases of the clock signal being monitored by the clock monitoring circuit is determined by both a width of the pulses in each of the pulse trains generated by edge detectors of either ring pulse generator, e.g., the unit pulse width, and a number of edge detectors in each of the ring pulse generators. For example, a shorter pulse width of the generated pulse trains and a larger number of edge detectors in the ring pulse generate will yield a greater resolution of the duration of either the low or high phases of the clock signal being monitored by the clock monitoring circuit. As there conventionally is some nominal variation of clock signals, care must be taken in considering the detection resolution and a corresponding design of the ring pulse generators in order to prevent false positive alerts.

The low power and area clock monitoring circuit further includes a counter circuit that comprises two n-bit counters. One of the pulse trains from the first ring pulse generator (e.g., for the low phase of the clock signal input to the clock monitoring circuit) is selected to be input to a first one of the two n-bit counters of the counter circuit and one of the pulse trains from second ring pulse generator (e.g., for the high phase of the clock signal input to the clock monitoring circuit) is selected to be input to a second one of the two n-bit counters of the counter circuit. The first n-bit counter counts a number of pulses for, e.g., the low phase of the clock signal input to the clock monitoring circuit, i.e., a low phase count ("LPC"). The second n-bit counter counts a number of pulses for, e.g., the high phase of the clock signal input to the clock monitoring circuit, i.e., a high phase count ("HPC").

The LPC and HPC of the n-bit counters are employed to determine if the clock signal has slowed (i.e., the duration of a subsequent phase of the clock signal input to the clock monitoring circuit is longer) and if the clock signal has sped up (i.e., the duration of a subsequent phase of the clock signal input to the clock monitoring circuit is shorter). These detections are performed by circuits of the low power and area clock monitoring circuit. For example, a clock slow detect ("CSD") circuit determines if the clock signal input to the clock monitoring circuit has slowed and, e.g., a clock fast detect ("CFD") circuit determines if the clock signal input to the clock monitoring circuit has sped up.

The above-disclosed low power and area clock monitoring circuit detects the above-defined clock abnormalities, specifically, missed single clock pulses, shorter pulses, longer pulses, glitches, and, importantly, cycle to cycle variation of the clock signal. Moreover, the above-disclosed low power and area clock monitoring circuit does not generate false positive alerts and detects clock abnormalities for every clock cycle. The above-disclosed low power and area clock monitoring circuit requires significantly smaller area and has significantly smaller power consumption requirements than conventional clock monitoring circuits. As such, many of the above-disclosed low power and area clock monitoring circuits can be deployed on a single integrated circuit (IC) to monitor many different clock signals and, thus, clock signals at many different locations on the IC may be monitored at a same time as well. The above-disclosed low power and area clock monitoring circuit does not require silicon tuning after deployment. And the above-disclosed low power and area clock monitoring circuit can operate with very slow clocks, e.g., 32 kHz clocks and with very high clock frequencies, e.g., 800 MHz clocks in a small area with only a change in a width of the above-described counter/comparator circuits to account for the differing clock frequencies. Moreover, the above-disclosed low power and area clock monitoring circuit can also detect supply voltage glitches and over voltage supply voltage conditions.

Instances of the above-disclosed clock monitoring circuit can be deployed on an IC, each instance deployed to monitor one of a plurality of clocks used in the IC. The clock signal being monitored can be the above-described clock signal generated by clock circuit external to the IC that includes the quartz crystal. Or the clock signal being monitored can be clocks generated internally in the IC by, e.g., PLL generated PLL clocks. The externally generated clock signals and/or the internally generated clock signals are supplied to various processing subsystems of the IC. Examples of the subsystems of the IC can be one or more central processing units ("CPUs"), one or more graphics processing units ("GPUs"), one or more memory controllers, or any other subsystems that are typically present in a computing device. The CAD signal generated by the clock monitoring circuit on the IC can be input to the various processing subsystems of the IC where the various processing subsystems act on the CAD signal. For example, for the above-mentioned security concerns, some or all of the various processing subsystems could reset upon receipt of the CAD signal. And, e.g., for the above-mentioned safety concerns some or all of the various processing subsystems could log instances of the CAD signal and, in some instances, reset the various processing subsystems.

Referring to the drawings, specifically FIG. 1 is a block diagram illustrating an example of a low power and area clock monitoring circuit using a ring delay arrangement 100, otherwise termed as a clock abnormality detector (CAD). A clock signal 110 to be monitored by the CAD, e.g., the clock signal generated by an external circuit employing the quartz crystal or one of the clock signals internally generated by the PLL circuits as disclosed above, are input to the CAD 100. When the CAD 100 detects one of the above-disclosed clock anomalies, e.g., missed single clock pulses, shorter pulses, longer pulses, glitches, and cycle to cycle variation of the clock signal, the CAD 100 outputs a clock abnormality detect signal (CAD signal) 120. Typically, voltage supplied to CAD 100 is a $V_{DD}$ 130 voltage supply and, further, the CAD 100 is typically connected to ground (GND) return path 140.

Figure 2:
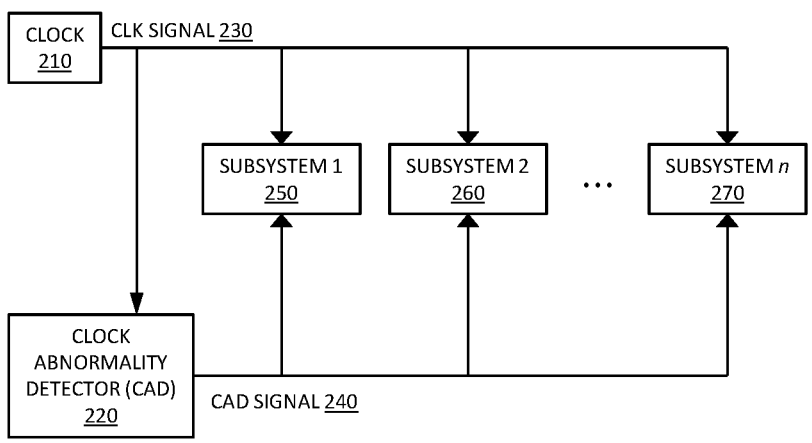
FIG. 2 illustrates an embodiment of a system using the CAD detector.

FIG. 2 illustrates a block diagram of an example system 200 utilizing the clock monitoring circuit 100 of FIG. 1. System 200 can be the above disclosed mobile devices, desktop computers, rack-mounted compute nodes in data centers, autonomous driving computing platforms, robotic systems, and autonomous vision computing platforms, etc. System 200 includes a clock circuit 210 which generates clock signal 230. Clock signal 230 can be, e.g., the clock signal generated by an external circuit employing the quartz crystal or one of the clock signals internally generated by the PLL circuits as disclosed above, similar to clock 110 of FIG. 1. Clock signal 230 is fed to clock abnormality detector (CAD) 220 which is similar to CAD 100 of FIG. 1. System 200 also includes a plurality of subsystems such as subsystem 1 250, subsystem 2 260, through subsystem n 270 as depicted in FIG. 2. Subsystems 1-n correspond to, e.g., the various processing subsystems disclosed above, e.g., the one or more central processing units ("CPUs"), one or more graphics processing units ("GPUs"), one or more memory controllers, or any other subsystems that are typically present in a computing device. Clock signal 230 is also fed to subsystems 1-n (e.g., subsystems 250, 260, 270).

As with CAD 100 of FIG. 1, CAD 220 of FIG. 2 detects clock abnormalities, e.g., one of the above-disclosed clock anomalies, e.g., missed single clock pulses, shorter pulses, longer pulses, glitches, and cycle to cycle variation of the clock signal. When CAD 220 detects one or more of these clock anomalies, CAD 220 generates CAD signal 240 which is fed back to subsystems 1-n (e.g., subsystems 250, 260, 270). When one or more of subsystems 250, 260, 270 receives CAD signal 230 from CAD 220, the one or more subsystem can, e.g., reset the subsystem (typically, e.g., in the above-disclosed security concerns) or log instances of the CAD signal 240 (typically, e.g., in the above-disclosed safety concerns). Of course, the subsystems 250, 260, 270, when receiving the CAD signal 240 from CAD 220 can perform other operations.

Figure 3:
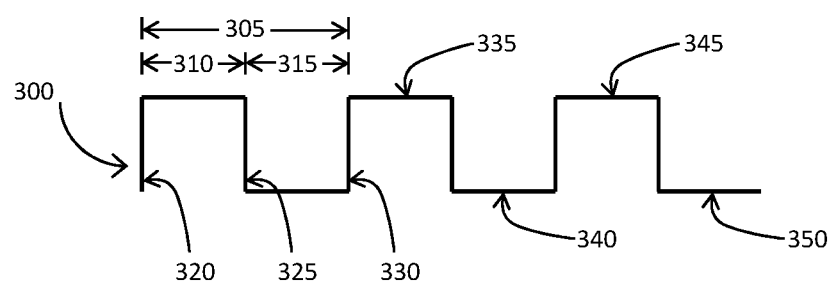
FIG. 3 illustrates an embodiment of a clock signal monitored by the CAD.

Clock signals such as those disclosed above may take a variety of forms. FIG. 3 illustrates an example clock signal 300. Clock signal 300 exhibits a cycle 305 during normal operation. A clock cycle corresponds to one clock period. A duration of the clock period for a given clock signal depends on a frequency at which the clock signal oscillates. For example, a clock signal oscillating at a frequency of 1 GHz exhibits $10^9$ cycles per second and exhibits a clock period having a duration of $10^{-9}$ seconds.

As disclosed above, each clock cycle 305 includes two opposite-state phases 310/315 in the sense that one of them corresponds to a clock state having a "high" voltage level (a "high phase" or "high clock state") while the other corresponds to a clock state having a "low" voltage level (a "low phase" or "low clock state"). As used herein, "high" and "low" are relative terms. A high voltage level may be, but need not be, e.g., substantially equal to a voltage supply level, e.g., $V_{DD}$. A low voltage level may be, but need not be, substantially equal to a ground voltage. A high voltage level may correspond to, e.g., a Boolean "true" value while a low voltage may correspond to, e.g., a Boolean "false" level or vice versa, depending on a design convention used for a given system.

Each phase of a clock signal has a start or a beginning and each phase has an end. For example, high phase 310, as depicted in FIG. 3 has a start or beginning 320 and an end 325. Similarly, low phase 315 has a start or beginning 325 and an end 330. A clock "edge" as used herein refers to a transition from one clock state, or clock phase, to another in a clock cycle. A clock edge may have one of two directions depending on whether the corresponding transition is from a low state (or phase) to a high state (or phase), e.g., a "rising edge" or from a high state (or phase) to a low state (or phase), e.g., a "falling edge." For example, the beginning 320 of clock phase 310 corresponds to a rising edge of clock signal 300 and the end 325 of clock phase 310 corresponds to a falling edge of clock signal 300. In clock signals that oscillate between opposite-state phases, the end of a previous phase may be equivalent to the start or beginning of a subsequent phase that immediately follows the previous phase. In embodiments, the start or beginning of any clock phase may be detected using a variety of techniques such as by detecting a clock edge, or by sensing a high or a low voltage level in the clock signal, or both.

The phrase "duty cycle" as used herein refers to a ratio between a high phase duration for a clock signal and the cycle period for the clock signal. Clock signal 300 is an example of a clock signal having a 50% duty cycle since each of opposite-state phases 310, 315 has the same duration. Thus, the duration of high phase 310 is half that of cycle period 305. "Phase instance" as used herein refers to any one occurrence of any phase of a clock signal. For purposes of illustration, six phase instances of clock signal 300 are labeled in FIG. 3. High phase 310 represents a first phase instance of clock signal 300 and low phase 315 represents a second phase instance of clock signal 300. Similarly, phases 335, 340, 345, and 350 represent third, fourth, fifth, and sixth phase instances of clock signal 300, respectively. In this sense, clock signal 300 represents a series of clock phase instances. Moreover, phases 310, 335, and 345 correspond to first, second, and third instances of the high phase of clock signal 300, while phases 315, 340, and 350 correspond to first, second, and third instances of the low phase of clock signal 300.

In some embodiments, the clock signal to be monitored has a duty cycle of 50%. In other embodiments, the clock signal to be monitored has an acceptable duty cycle of other than 50% as disclosed below. Or the clock signal is adapted to account for noise which affects the clock signal, e.g., a noise aware frequency lock loop (NAFLL) clock signal. In some embodiments, because of, e.g., this noise, there is a clock uncertainty in the clock signal that will falsely trigger a clock abnormality alert signal. This disclosure adds a required margin or guard band to the monitoring of a clock signal to allow for expected phase-to-phase variation of the clock signal (from, e.g., a non-50% duty cycle clock signal, a NAFLL clock signal, or clock uncertainty) without generating the clock abnormality alert signal while generating the clock abnormality alert signal when unexpected phase-to-phase variation of the clock signal occurs.

Figure 4:
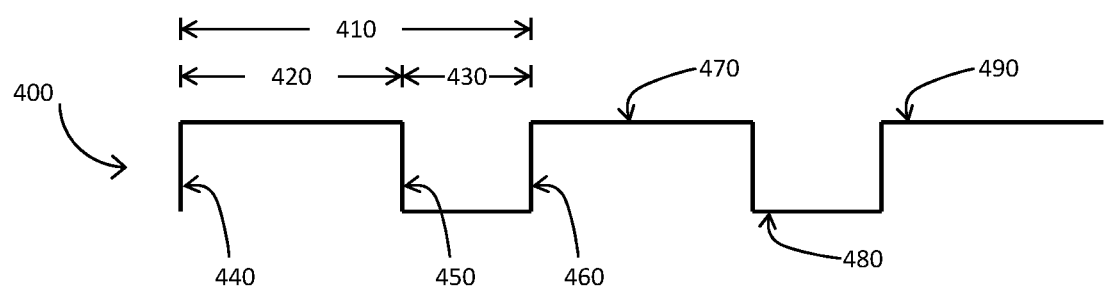
FIG. 4 illustrates an embodiment of a clock signal with a non-50% duty cycle monitored by the CAD.

FIG. 4 illustrates an example clock signal 400 with a non-50% duty cycle. Clock signal 400 exhibits a cycle 410 during normal operation. Each clock cycle 410 includes two opposite-state phases, e.g., high phase 420 and low phase 430. High phase 420, as depicted in FIG. 4 has a start or beginning 440 and an end 450. Similarly, low phase 430 has a start or beginning 450 and an end 460. The beginning 440 of clock phase 420 corresponds to a rising edge of clock signal 400 and the end 450 of clock phase 420 corresponds to a falling edge of clock signal 400. Five phase instances of clock signal 400 are depicted in FIG. 4, with first phase instance 420, third phase instance 470, and fifth phase instance 490 corresponding to high phases of clock signal 400 and second phase instance 430 and fourth phase instance 480 corresponding to low phases of clock signal 400.

Since each of opposite-state phases 420, 430 has a different duration, clock signal 400 does not have a 50% duty cycle. If, e.g., high phase 420 has a duration that is 60% of clock cycle 410 (and, hence, e.g., low phase 430 would have a duration of 40% of clock cycle 410), clock cycle 410 would have a 60% duty cycle.

As disclosed above, the clock signal being monitored may have an expected phase-to-phase variation. In one embodiment, this expected phase-to-phase variation is a result of a non-50% duty cycle clock signal, e.g., clock signal 400 of FIG. 4 disclosed above. In other embodiments, the expected phase-to-phase variation is a result of a known noise event generated by a noise adaptive clock signal, e.g., the NAFLL clock disclosed above. In other embodiments, the phase-to-phase variation is a result of a clock uncertainty as disclosed above. This disclosure compensates for these expected clock signal phase-to-phase variations without generating a clock abnormality alert signal by introducing a required margin or guard band to the monitoring of the clock signal. Of course, unexpected phase-to-phase variations will generate a clock abnormality alert signal.

Figure 5:
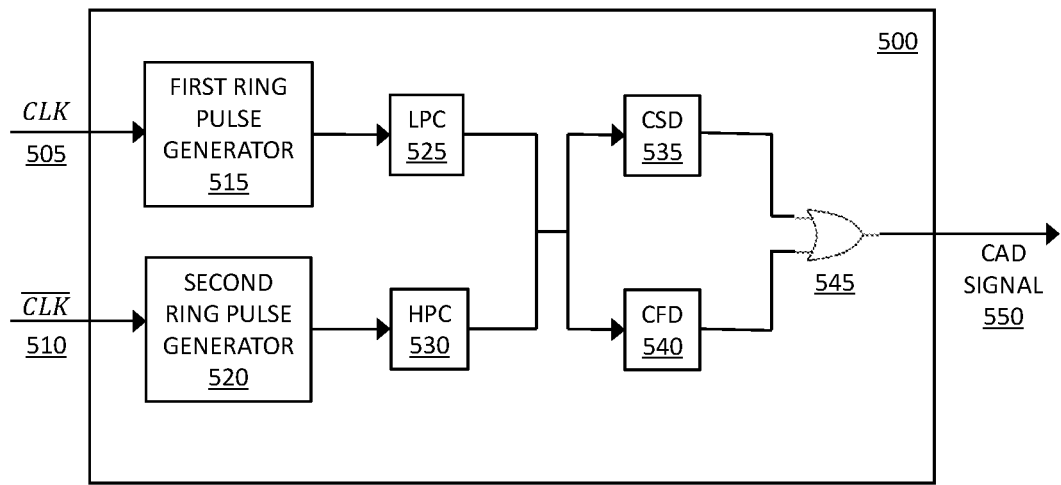
FIG. 5 illustrates an embodiment of a block diagram of the CAD.

FIG. 5 illustrates a block diagram of one embodiment of the clock monitoring circuit of FIG. 1. Similar to the low power and area clock monitoring circuit with ring delay arrangement disclosed above (and similar to CAD 100 of FIG. 1 and CAD 220 of FIG. 2), clock monitoring circuit 500 includes first ring pulse generator 515, second ring pulse generator 520, low phase count (LPC) counter 525, high phase count (HPC) counter 530, clock slow detect (CSD) circuit 535, clock fast detect (CFD) circuit 540, and logic function 545. As disclosed above and detailed below, clock monitoring circuit 500 receives both a clock input signal (CLK) 505 and its inverse signal ($\overline{CLK}$) 510. This clock signal 505 (and its inverse 510) is similar to that disclosed above, e.g., either a clock signal generated by an external circuit that includes a quartz crystal or an internally PLL generated clock signal. As disclosed below, clock monitoring circuit 500 outputs a clock abnormality signal 550 which indicates if there is an abnormality, e.g., one of the clock anomalies disclosed above, in the CLK signal 505.

Figure 6:
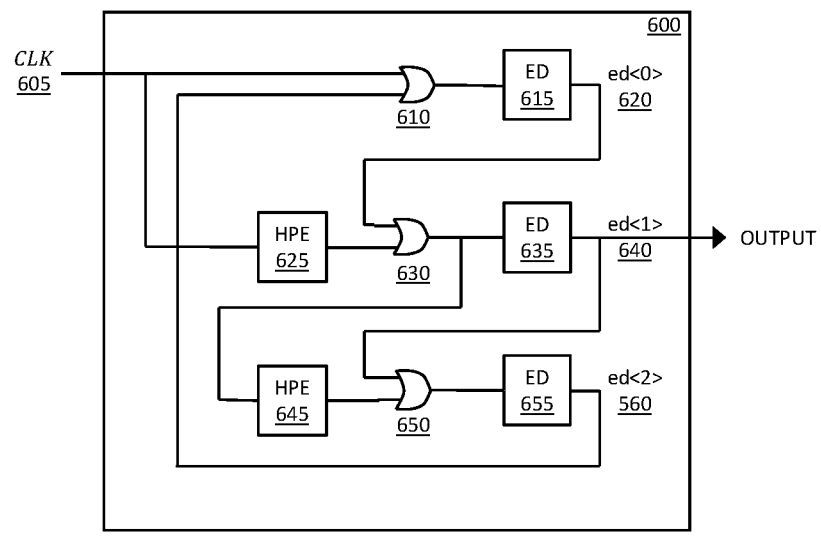
FIG. 6 illustrates an embodiment of a ring pulse generator of the CAD.

FIG. 6 illustrates a block diagram 600 of an example of first ring pulse generator 515 of the clock monitoring circuit 500 of FIG. 5. Block diagram 600 of FIG. 6 also illustrates an example of second ring pulse generator 520 of FIG. 5 (except that its input is the inverse of the CLK signal, e.g., $\overline{CLK}$). Of course, other circuit configurations could be used to implement the functionality of ring pulse generators 515 or 520.

Clock signal (CLK) 605 is input to ring pulse generator 600. Clock signal 605 is similar to CLK signal 110 of FIG. 1, CLK signal 230 of FIG. 2, CLK signal 300 of FIG. 3, and CLK signal 505 of FIG. 5 (or $\overline{CLK}$ 510). CLK signal 605 is input to a first logic function, e.g., first OR-gate 610 of ring pulse generator 600. The output of first OR-gate 610 is fed to first edge detector (ED) 615 of ring pulse generator 600. The output of first ED 615 is first pulse train 620 (ed<0>). Clock signal 605 is also fed to first high phase extender (HPE) 625 of ring pulse generator 600. First pulse train 620 and an output of first HPE 625 are fed to a second logic function, e.g., second OR-gate 630 of ring pulse generator 600. The output of second or-gate 630 is fed to second edge detector 635 of ring pulse generator 600. The output of second ED 635 is second pulse train 640 (ed<1>). The output of second OR-gate 630 is also fed to second HPE 645 of ring pulse generator 600. Second pulse train 640 and an output from second HPE 645 are fed to a third logic function, e.g., third OR-gate 650 of ring pulse detector 600. The output of third OR-gate 650 is fed to third edge detector 655 of ring pulse generator 600. The output of third ED 655 is third pulse train 660 (ed<2>). Third pulse train 660 is fed back as another input to first OR-gate 610. Second pulse train 640 is output from ring pulse generator 600.

Ring pulse generator 600, as disclosed above, includes three edge detectors. In other embodiments, ring pulse generator could include 1, 2, 4, or more edge detectors. Furthermore, ring pulse generator 600, as disclosed above, outputs second pulse train 640. In other embodiments, ring pulse generator 600 outputs first pulse train 620 or third pulse train 660 rather than second pulse train 640. Moreover, in other embodiments of ring pulse generator 600 with more than three edge detectors, a pulse train from any one of the more than three edge detectors are output from ring pulse generator 600.

As disclosed above, a detection resolution of the duration of either a high phase or low phases of the clock signal being monitored by the clock monitoring circuit is determined by the number of edge detectors in the ring pulse generator and a larger number of edge detectors in the ring pulse generate will yield a greater resolution of the duration of either the low or high phases of the clock signal being monitored by the clock monitoring circuit.

Figure 7:
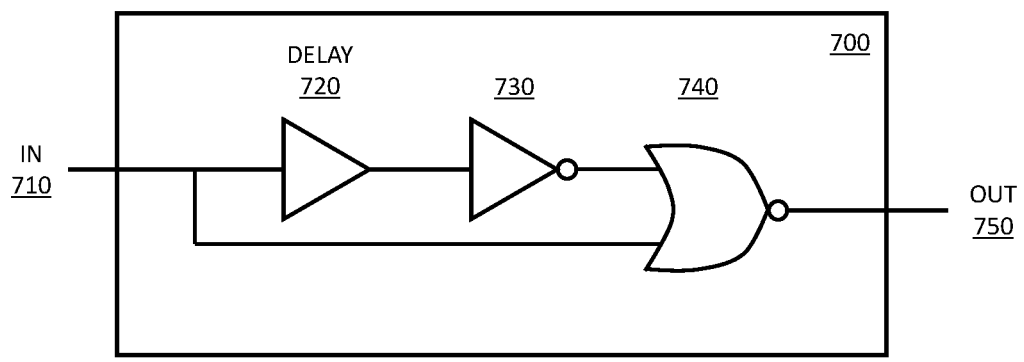
FIG. 7 illustrates an embodiment of an edge detector of the ring pulse generator.
Figure 7:
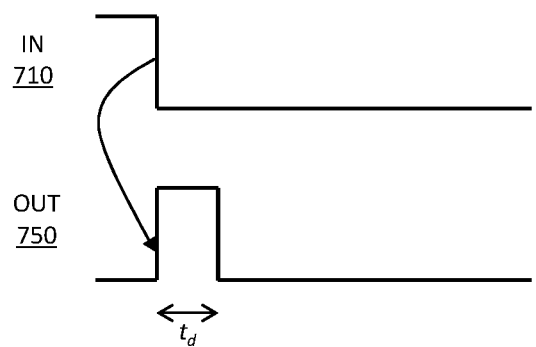

FIG. 7 illustrates a block diagram 700 of, e.g., any of the edge detectors 615, 635, 655 of FIG. 6. Edge detector 700 is configured to detect a falling edge of a clock signal input to edge detector 700. A block diagram for an edge detector detecting a rising edge of a clock signal input to the edge detector is of similar structure. Of course, other circuit configurations could be used to implement the functionality of edge detector 700 (to detect either a falling or rising edge of a clock signal input to the edge detector).

A signal input to ED 700, e.g., input 710, from, e.g., OR-gate 610, 630, or 650 of FIG. 6 is fed to delay element 720 and an input of logic function 740, e.g., NOR-gate 740. The output of delay element 720 is fed to inverter 730. The output of inverter 730 is fed to another input of logic function 740, e.g., NOR-gate 740. The output of logic function 740, e.g., NOR-gate 740, is output 750 of edge detector 700. As depicted in the associated timing diagram of FIG. 9, the structure of edge detector 700 disclosed above functions to assert a high signal on the output of edge detector 700 for a duration of ta upon detection of a falling edge of a signal input to edge detector 700. The width of ta is based on the electrical characteristics of delay element 720, inverter 730, and logic function 740, e.g., NOR-gate 740.

Figure 8:
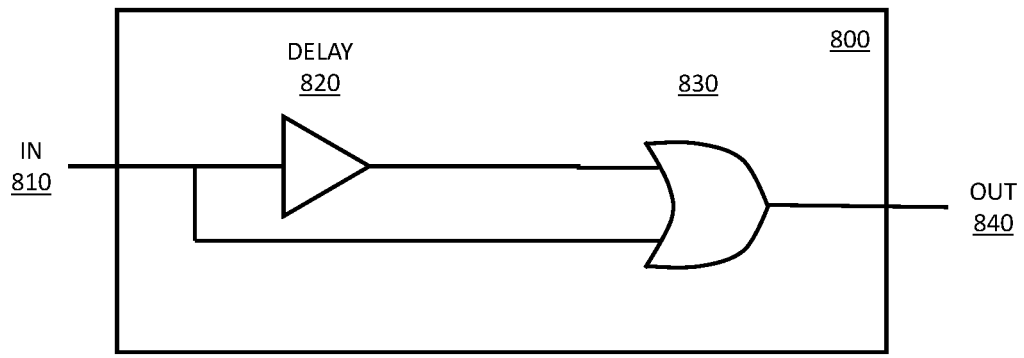
FIG. 8 illustrates an embodiment of a high phase extender of the ring pulse generator.

FIG. 8 illustrates a block diagram 800 of an example of, e.g., either of HPE 625 or HPE 645 of FIG. 6. Of course other circuit configurations could be used to implement the functionality of HPE 800. A signal input to HPE 800, e.g., input 810 from, e.g., CLK 605 or second OR-gate 630 of FIG. 6 is fed to delay element 820 and an input of logic function 830, e.g., OR-gate 830. The output of delay element 820 is fed to another input of OR-gate 830. The output 840 of OR-gate 830 is the output of HPE 800.

Figure 9:
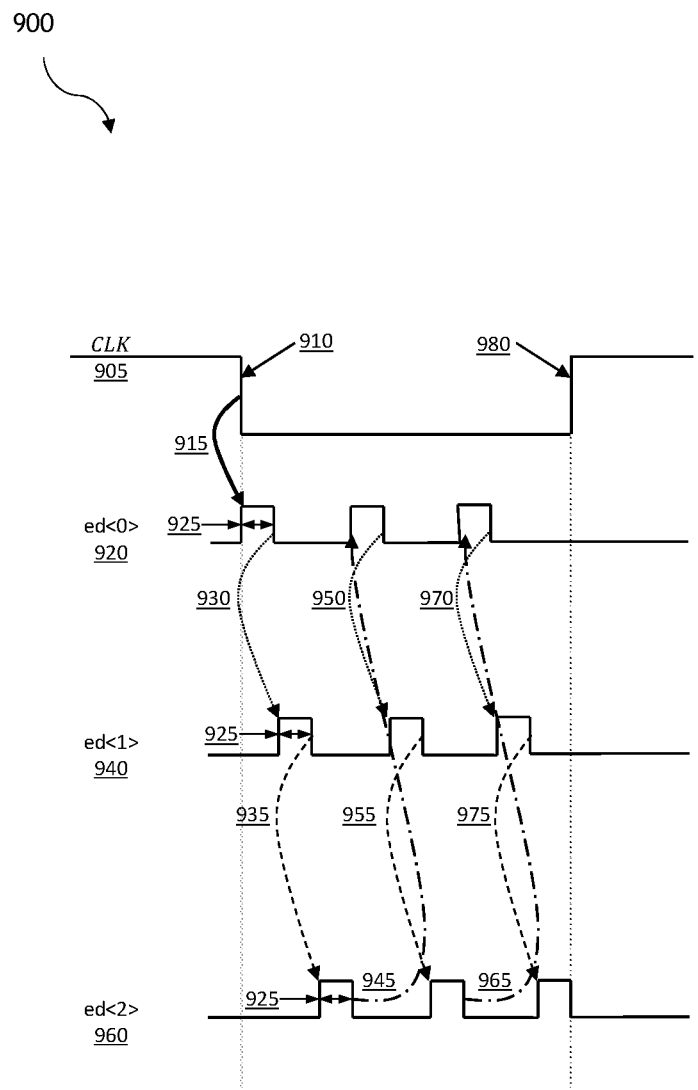
FIG. 9 illustrates an embodiment of a timing diagram of the ring pulse generator.

FIG. 9 illustrates a timing diagram 900 of the signals of a ring pulse generator, e.g., ring pulse generator 600 of FIG. 6. Clock signal 905 is similar to, e.g., CLK signal 605 of FIG. 6. First pulse train 920 is similar to, e.g., first pulse train 620 of FIG. 6 (e.g., ed<0>). Second pulse train 940 is similar to, e.g., second pulse train 640 of FIG. 6 (e.g., ed<1>). And third pulse train 960 is similar to, e.g., third pulse train 660 of FIG. 6 (e.g., <2>).

In an example of operation of the disclosed first ring pulse generator of the low power and area clock monitoring circuit, e.g., ring pulse generator 515 of FIG. 5 or ring pulse generator 600 of FIG. 6 as disclosed above, when the first ring pulse generator detects a falling edge (910) of the clock signal input thereto (depicted by arrow 915), a first edge detector of the first ring pulse generator, e.g., edge detector 615 of FIG. 6, outputs a first pulse of a first pulse train, e.g., first pulse train 620 of FIG. 6 or first pulse train 920 of FIG. 9 (ed<0>), with a unit pulse width, e.g., unit pulse width 925. A second edge detector of the first ring pulse generator, e.g., edge detector 635 of FIG. 6, outputs a first pulse of a second pulse train, e.g., second pulse train 640 of FIG. 6 or second pulse train 940 of FIG. 9 (ed<1>), with unit pulse width, e.g., unit pulse width 925, upon detecting a falling edge of the first pulse of the first pulse train received from the first edge detector (depicted by arrow 930). A third edge detector of the first ring pulse generator, e.g., edge detector 655 of FIG. 6, outputs a first pulse of a third pulse train, e.g., third pulse train 660 of FIG. 6 or third pulse train 960 of FIG. 9 (ed<2>), with a unit pulse width, e.g., unit pulse width 925, upon detecting a falling edge of the first pulse second pulse train received from the second edge detector (depicted by arrow 935).

Then, the first edge detector of the first ring pulse generator, e.g., edge detector 615 of FIG. 6, generates a subsequent pulse of the first pulse train with a unit pulse width, e.g., unit pulse width 925, upon detecting a falling edge of the first pulse of the third pulse train received from the third edge detector (depicted by arrow 945). The second edge detector of the first ring pulse generator, e.g., edge detector 635 of FIG. 6, then generates a subsequent pulse of the second pulse train with a unit pulse width, e.g., unit pulse width 925, upon detecting a falling edge of the subsequent pulse of the first pulse train received from the first edge detector (depicted by arrow 950). The third edge detector of the first ring pulse generator, e.g., edge detector 655 of FIG. 6, then generates a subsequent pulse of the third pulse train with a unit pulse width, e.g., unit pulse width 925, upon detecting a falling edge of the subsequent pulse of the second pulse train received from the second edge detector (depicted by arrow 955). This process continues (as depicted by arrows 965, 970, and 975) until the first ring pulse generator detects a rising edge (980) of the clock signal input to the first ring pulse generator. In this example, the first, second and third pulse trains of the first ring pulse generator are generated for a low phase of the clock signal input to the first ring pulse generator.

In a similar manner, a first, second, and third pulse train is generated by the second ring pulse generator of the low power and area clock monitoring circuit, e.g., ring pulse generator 520 of FIG. 5 or ring pulse generator 600 of FIG. 6 as disclosed above. However, this second ring pulse generator generates its first, second, and third pulse trains based on detection by the second ring pulse generator of an edge of an inverse of the clock signal input to the first ring pulse generator, e.g., $\overline{CLK}$. In the example given above, the second ring pulse generator would generate its first, second, and third pulse trains based upon detection of a rising edge of the inverse clock signal input to the second ring pulse generator (inverse of the clock signal input to the first ring pulse generator) and this second ring pulse generator would generate its first, second, and third pulse trains until detection of a falling edge of the inverse clock signal input to the second ring pulse generator. In this example, the first, second and third pulse trains of the second ring pulse generator are generated for a high phase of the clock signal input to the first ring pulse generators.

In most instances, the clock signal input to the second ring pulse generator is the inverse of the clock signal input to the first ring pulse generator. As with the first ring pulse generator, while the above example discloses three edge detectors of the second ring pulse generator generating three separate pulse trains, the second ring pulse generator can include any number of edge detectors to generate any number of separate pulse trains. In some embodiments, the first and second ring pulse generators include a same number of edge detectors and in other embodiments the first and second ring pulse generators include a different number of edge detectors. As with the first ring pulse generator, the second ring pulse generator can generate pulse trains with a same unit pulse width in its respective pulse train or the second ring pulse generator can generate pulse trains with a different unit pulse width in its respective pulse train. And also as with the first ring pulse generator, the second pulse ring generator can generate pulse trains with a same pulse width in each pulse train or the second ring pulse generator can generate differing pulse widths in each pulse train.

Figure 10A:
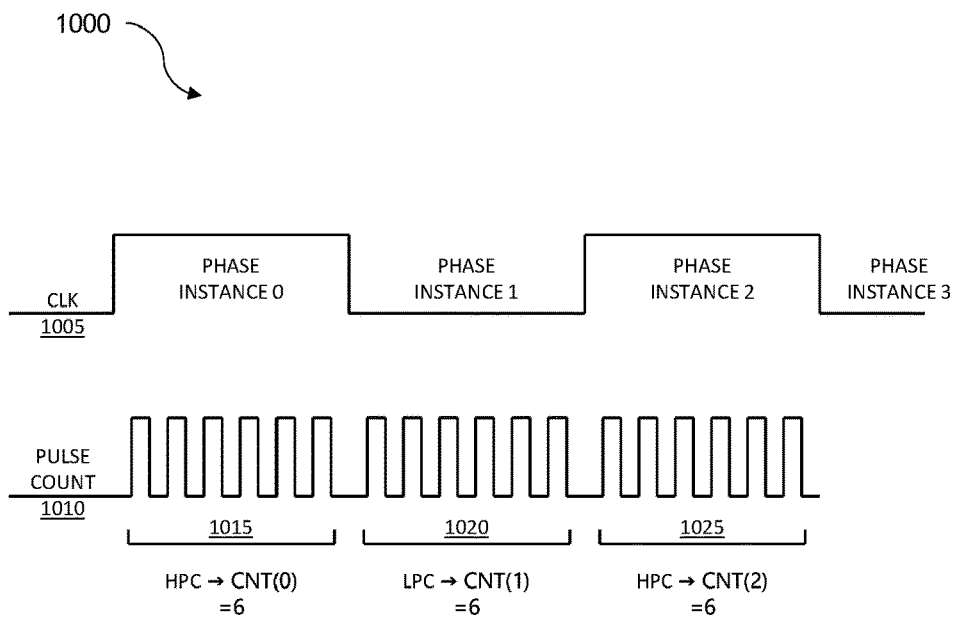
FIG. 10A illustrates a timing diagram and associated pulse count waveform for a clock signal.
Figure 10B:
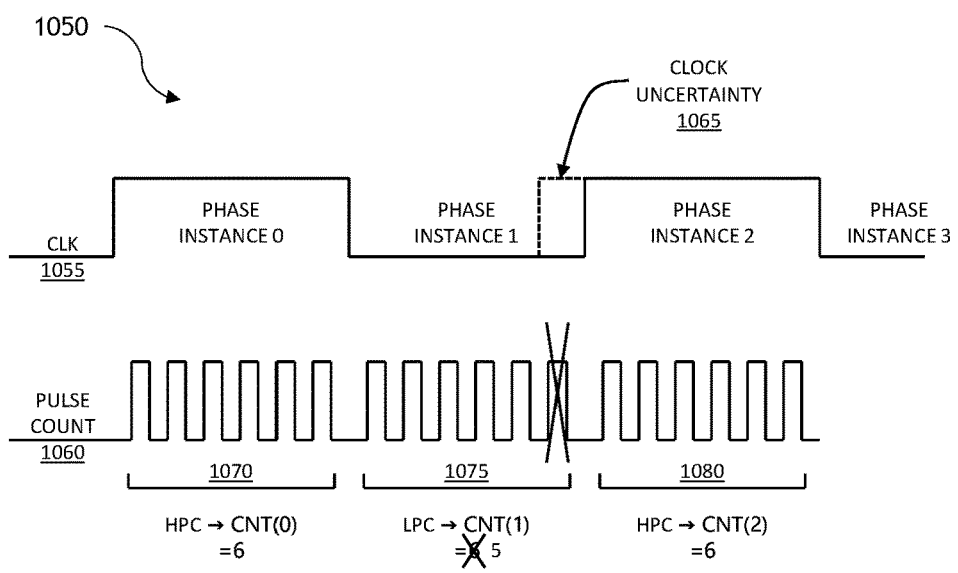
FIG. 10B illustrates a timing diagram and associated pulse count waveform for a clock signal with a clock uncertainty.

As disclosed above, a clock abnormality detector (CAD), e.g., CAD 100 of FIG. 1, determines a clock abnormality, e.g., a clock slow condition, a clock fast condition, a clock stop condition, a clock glitch, etc., by comparing a count of a number of pulses for subsequent phases of the clock signal, e.g., a high and subsequent low phase of a clock signal. As depicted in FIGS. 6 and 9, the configuration of the depicted ring pulse generator includes three edge detectors (FIG. 6) which yields a pulse train with a pulse count of three for a low phase of a clock signal (e.g., clock signal 905 of FIG. 9). Similarly, FIG. 10A-10B illustrate timing diagrams 1000, 1050 for clock signals 1005 and 1055, respectively. Rather than a pulse train with a pulse count of three as depicted in FIGS. 6 and 9, pulse count 1010 depicts a pulse train with a pulse count of six for each phase of clock signal 1005. Pulse count subset 1015 depicts a pulse count of six for phase instance 0 of clock signal 1005 (a high phase count (HPC) of six for phase instance 0, e.g., HPC CNT(0)=6). Pulse count subset 1020 depicts a pulse count of six for phase instance 1 of clock signal 1005 (a low phase count (LPC) of six for phase instance 1, e.g., LPC CNT(1)=6). Pulse count subset 1025 depicts a pulse count of six for phase instance 2 of clock signal 1005 (a HPC of six for phase instance 2, e.g., HPC CNT(2)=6).

FIG. 10B illustrates timing diagram 1050 for clock signal 1055, similar to timing diagram 1000 in FIG. 10A for clock signal 1005. However, timing diagram 1050 illustrates a pulse train where there is an expected phase-to-phase variation between a high and low phase of a clock signal, e.g., an expected phase-to-phase variation between high phase instance 0 and subsequent low phase instance 1 of clock signal 1055. This expected phase-to-phase variation, in some embodiments, is a known clock uncertainty. In other embodiments, the expected phase-to-phase variation is a result of a noise event generated by a noise adaptive clock signal, e.g., the NAFLL clock disclosed above. In other embodiments, the expected phase-to-phase variation is a result of a non-50% duty cycle clock as disclosed above.

In the embodiment of timing diagram 1050 for clock signal 1055 and pulse count 1060 depicted in FIG. 10B, the basis for the expected phase-to-phase variation is clock uncertainty 1065. In clock uncertainty 1065, the rising edge of clock signal 1055 for phase instance 2 occurs earlier than the similar rising edge for phase instance 2 of clock signal 1005 of FIG. 10A. As a result of clock uncertainty 1065, the above disclosed ring generator will generate a pulse train of five pulses rather than six (e.g., LPC CNT(1)=5, not 6). However, since this phase-to-phase variation is expected, a clock abnormality alert signal must not be generated (in this embodiment, e.g., since LPC CNT(1) is less than HPC CNT(0) a clock fast clock abnormality signal would normally be generated).

Figure 11:
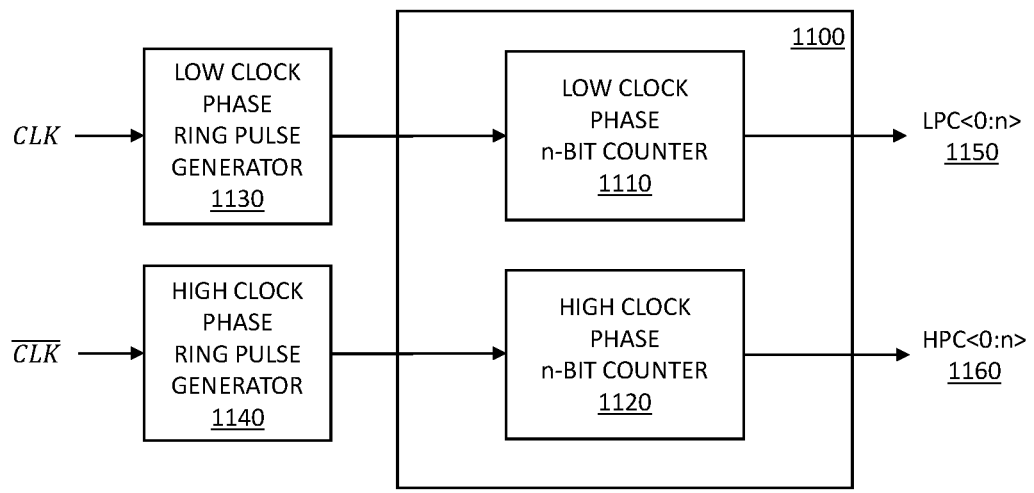
FIG. 11 illustrates an embodiment of a counter circuit of the CAD.

FIG. 11 illustrates a block diagram of an embodiment of counter circuit 1100 constructed according to principles of the disclosure. Counter circuit 1100 includes, in one embodiment, at least two n-bit counters, e.g., counters 1110 and 1120. A pulse train from a ring pulse generator, e.g., low clock phase ring pulse generator 1130 is input into one of the two n-bit counters of counter circuit 1100, e.g., low clock phase counter 1110. Low clock phase ring pulse generator 1130 is similar to first ring pulse generator 515 of FIG. 5 and ring pulse generator 600 of FIG. 6 as disclosed above. In one embodiment, the pulse train from low clock phase ring pulse generator 1130 represents a duration of a low phase of a clock signal, e.g., CLK, input into low clock phase ring pulse generator 1130 where a unit pulse width and a number of pulses of the pulse train from low clock phase ring pulse generator 1130 are indicative of a duration of a low phase of clock signal CLK. As disclosed above, the pulse train from low clock phase ring pulse generator 1130 can be generated by any number of edge detectors contained therein, e.g., pulse trains 620, 640, or 660 from edge detectors 615, 635, or 655, respectively of FIG. 6. The output of low clock phase n-bit counter 1110, e.g., LPC <0:n> 1150, is a count of pulses for the low phase of clock signal CLK. Low clock phase n-bit counter 1110 is reset at a beginning of the low phase of clock signal CLK. Resetting is delayed until after a last pulse has been counted for pulse train from low clock phase ring pulse generator 1130.

A pulse train from another ring pulse generator, e.g., high clock phase ring pulse generator 1140 is input into another one of the two n-bit counters of counter circuit 1100, e.g., high clock phase counter 1120. Hight clock phase ring pulse generator 1140 is similar to second ring pulse generator 520 of FIG. 5 and ring pulse generator 600 of FIG. 6 as disclosed above. In one embodiment, the pulse train from high clock phase ring pulse generator 1140 represents a duration of a high phase of a clock signal, e.g., $\overline{CLK}$, input into high clock phase ring pulse generator 1140 where a unit pulse width and a number of pulses of the pulse train from high clock phase ring pulse generator 1140 are indicative of a duration of a high phase of clock signal $\overline{CLK}$. As disclosed above, the pulse train from high clock phase ring pulse generator 1140 can be generated by any number of edge detectors contained therein, e.g., pulse trains 620, 640, or 660 from edge detectors 615, 635, or 655, respectively of FIG. 6. The output of high clock phase n-bit counter 1120, e.g., HPC <0:n> 1160, is a count of pulses for the low phase of clock signal $\overline{CLK}$. High clock phase n-bit counter 1120 is reset at a beginning of the high phase of clock signal $\overline{CLK}$. Resetting is delayed until after a last pulse has been counted for pulse train from high clock phase ring pulse generator 1140.

Thus, the output from a counter circuit, e.g., counter circuit 1100, are counts, e.g., LPC<0:n> 1150 and HPC<0:n> 1160, from two n-bit counters, e.g., low clock phase n-bit counter 1110 and high clock phase n-bit counter 1120. The counts, e.g., LPC<0:n> 1150 and HPC<0:n> 1160, each represents a duration of a low phase of a clock signal, e.g., CLK and a high phase of an inverse of clock signal CLK, e.g., $\overline{CLK}$, respectively.

Figure 12:
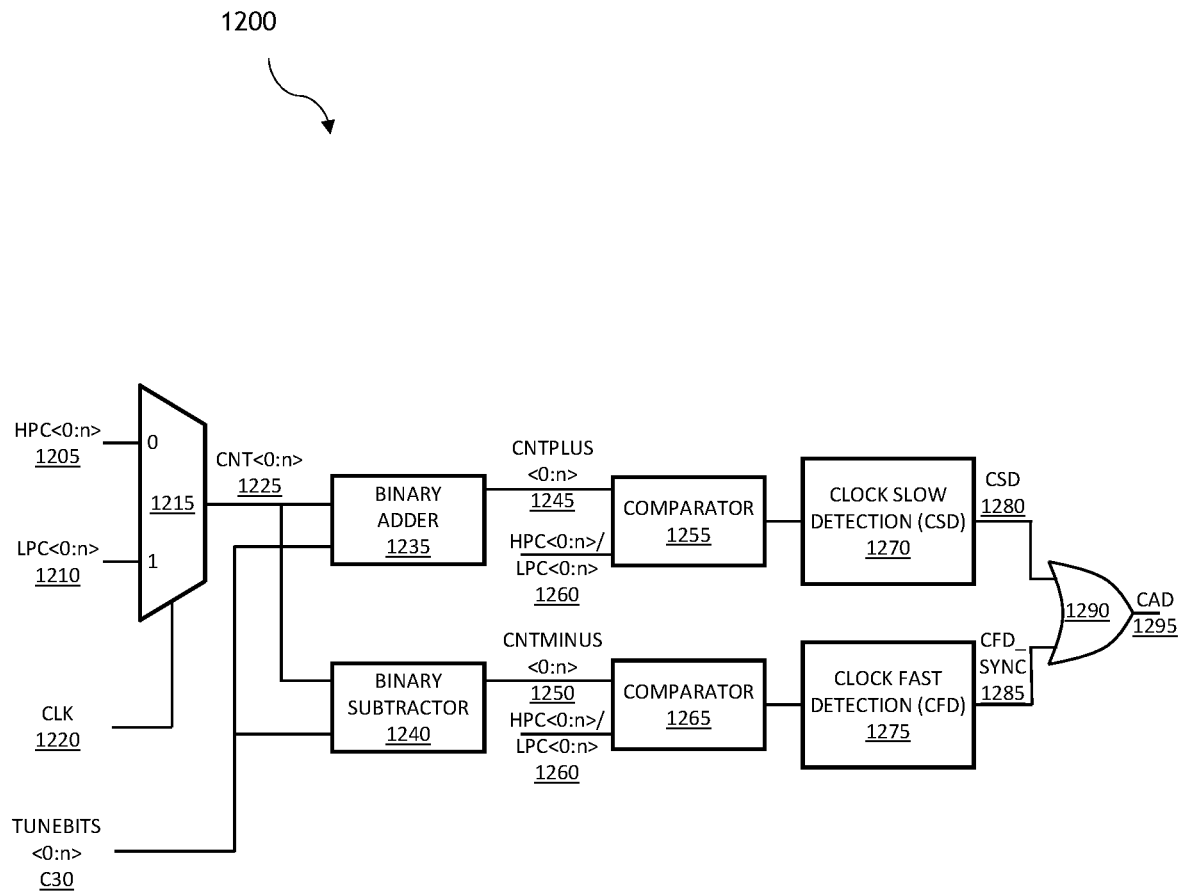
FIG. 12 illustrates an embodiment of a block diagram of the CAD which detects a clock abnormality of a clock signal with a clock uncertainty.

FIG. 12 illustrates a block diagram 1200 of another embodiment of a low power and area clock monitoring circuit using a ring delay arrangement where the clock monitoring circuit allows for the expected clock signal phase-to-phase variations disclosed above. In order to compensate for expected clock signal phase-to-phase variations, e.g., an expected phase-to-phase variation where a subsequent phase is short or longer, tune bits are employed to provide an offset in an amount equal to the expected phase-to-phase variation. In the example disclosed above in FIGS. 10A-10B a clock uncertainty, e.g., clock uncertainty 1065, corresponds to an LPC of five with a HPC of six for the immediately preceding high phase instance 0. In other embodiments, e.g., for expected phase-to-phase variations for other clock uncertainties, noise adaptive clock signals, or non-50% duty cycle clock signals, the number of tune bits can increase based on the expected phase-to-phase variation and based on pulse count of the immediately preceding phase. In the example disclosed above in FIGS. 10A-10B where an immediately preceding phase, e.g., phase instance 0 (sometimes referred to herein as a "reference phase") has a count, e.g., a HPC of six, the number of tune bits that can be used is one, two, three, four, five, or six, depending on the expected phase-to-phase variation. But the number of tune bits in this example cannot exceed six bits as the reference phase only includes six pulses. Of course, where a reference phase has a higher count, a higher number of tune bits could be used.

In addition to the use of tune bits as disclosed above for expected phase-to-phase variations of a clock signal, separate counts and counters are used to determine a clock fast clock abnormality, e.g., clock fast detection (CFD) and to determine a clock slow clock abnormality, e.g., clock slow detection (CSD). That is, a same count and counter is not used for both CFD and CSD. Moreover, tune bits are only added to detect a clock slow clock abnormality and tune bits are only subtracted to detect a clock fast clock abnormality. In general, the tune bits modify a count for a reference phase instance of a clock signal and then the modified count for the reference phase instance of the clock signal is compared to a count for subsequent phase instance of the clock signal.

For example, using the example in FIG. 10B disclosed above, the pulse count for reference phase instance 0 of pulse count subset 1070 is six and the pulse count for subsequent phase instance 1 considering the expected phase-to-phase variation of clock uncertainty 1065 of pulse count subset 1075 is five. When detecting a clock fast clock abnormality, a tune bit with the value of one is subtracted from pulse count subset 1070 for reference phase instant 0, yielding a modified pulse count for reference phase instance 0 of five. Since, as shown in FIG. 10B, the pulse count for subsequent phase instance 1 considering the expected phase-to-phase variation of clock uncertainty 1065 is five and the modified pulse count for reference phase instance 0 is five, no clock fast detect (CFD) signal will be generated. However, if the pulse count for subsequent phase instance 1 were to be, e.g., four, a CFD signal would be generated since the modified pulse count for reference phase 0 of five is greater than the pulse count of four for subsequent phase instance 1.

In another example, assume a pulse count for reference phase instance 0 is six and assume that based on a clock uncertainty (or clock noise or a non-50% duty cycle clock) the pulse count for subsequent phase instance 1 is seven, yielding an expected phase-to-phase variation of one pulse. In this example, a tune bit having a value of one would be needed to compensate for the expected phase-to-phase variation. When detecting for a clock slow clock abnormality, the tune bit having a value of one is added to pulse count of six for reference phase instance 0, yielding a modified pulse count of seven for reference phase instance 0. If the pulse count for subsequent phase instance 1 is seven based on the expected phase-to-phase variation, no clock slow detect (CSD) signal will be generated since the modified pulse count for reference phase instance 0 is equal to the pulse count for subsequent phase instance 1. However, if the pulse count for subsequent phase instance 1 is eight (or higher), a CSD signal will be generated since the pulse count for subsequent phase instance 1 is greater than the modified pulse count for phase instance 0.

As disclosed above, tune bits are only added to a pulse count for a reference phase instance when detecting for clock slow clock abnormalities and tune bits are only subtracted from the pulse count for the reference phase instance when detecting for clock fast clock abnormalities. As such, separate comparisons (using separate comparators) must be made when detecting for clock slow clock abnormalities and when detecting for clock fast clock abnormalities.

FIG. 12 illustrates an embodiment of circuit 1200 according to principles of the disclosure. High phase pulse count HPC <0:n> 1205, similar to HPC <0:n> 1160 of FIG. 11 as disclosed above, and low phase pulse count LPC <0:n> 1210, similar to LPC <0:n> 1150 of FIG. 11 as disclosed above, are input to multiplexer 1215. Multiplexer 1215 selects HPC <0:n> 1205 or LPC <0:n> 1210 based on clock signal 1220 (which is similar to clock signal 400 of FIG. 4 as disclosed above). The pulse count selected by multiplexer 1215, e.g., selected pulse count CNT <0:n> 1225 is input to both an input of binary adder 1235 and binary subtractor 1240. Also input to both an input of binary adder 1235 and binary subtractor 1240 are tune bits <0:n> 1230. In some embodiments, a user inputs tune bits <0:n> 1230 to the clock abnormality detector (CAD), e.g., CAD 100 of FIG. 1 as disclosed above. In other embodiments, other techniques, e.g., blowable fuses, etc., are used to fix tune bits <0:n> 1230.

As disclosed above, binary adder 1235 adds tune bits <0:n> 1230 to selected pulse count CNT <0:n> 1225 to yield a modified pulse count, e.g., pulse count CNTPLUS <0:n> 1245, when detecting for clock slow clock abnormalities. Also as disclosed above, binary subtractor 1240 subtracts tune bits <0:n> 1230 to selected pulse count CNT <0:n> 1225 to yield a modified pulse count, e.g., pulse count CNTMINUS <0:n> 1250, when detecting for clock fast clock abnormalities. However, as disclosed above, binary adder 1225 is not used for detecting clock fast clock abnormalities and binary subtractor 1240 is not used for detecting clock slow clock abnormalities. When detecting for clock slow clock abnormalities, an output of binary adder 1235, e.g., CNTPLUS <0:n> 1245 is input to comparator 1255 as well as a count of pulse for a subsequent phase instance, e.g., HPC <0:n>/LPC <0:n> 1260. When detecting for clock slow clock abnormalities, an output from comparator 1255 is input to CSD detection circuitry 1270 which asserts CSD signal 1280 when a clock slow clock abnormality is detected by CSD detection circuitry 1270.

When detecting for clock fast clock abnormalities, an output of binary subtractor 1240, e.g., CNTMINUS <0:n> 1250 is input to separate comparator 1265 as well as a count of pulse for a subsequent phase instance, e.g., HPC <0:n>/LPC<0:n> 1260. When detecting for clock fast clock abnormalities, an output from separate comparator 1265 is input to CFD detection circuitry 1275 which asserts CFD_synch signal 1285 when a clock fast clock abnormality is detected by CFD detection circuitry 1275.

The output of CSD detection circuitry 1270 and the output of CFD detection circuitry 1275 are input into logic function 1290. In some embodiments, logic function 1290 is an OR-gate. In these embodiments, if either CSD detection circuitry 1270 asserts CSD signal 1280 or CFD detection circuitry 1275 asserts CFD_synch signal 1285, OR-gate 1290 will output clock abnormality detect (CAD) signal 1295.

Figure 13:
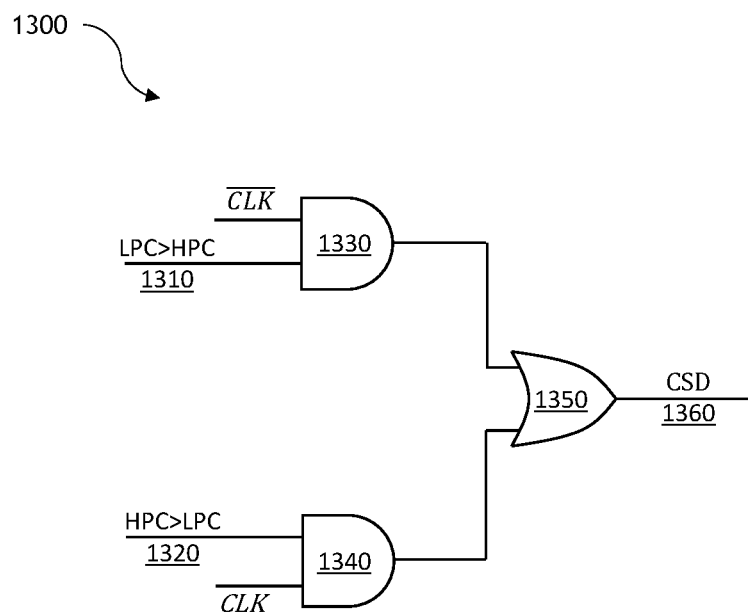
FIG. 13 illustrates an embodiment of clock slow detect (CSD) signal generation circuitry of the CAD.

FIG. 13 illustrates block diagram 1300 of an embodiment of CSD detection circuitry, e.g., CSD detection circuitry 1270 of FIG. 12, which asserts a CSD signal constructed according to principles of the disclosure. In one embodiment of CSD detection circuitry 1300, two signals are input to CSD detection circuitry 1300. One signal input to CSD detection circuitry 1300, e.g., signal 1310, indicates that modified pulse count 1245 of FIG. 12 is greater than subsequent pulse count 1260 of FIG. 12. Another signal input to CSD detection circuitry 1300, e.g., signal 1320, indicates subsequent pulse count 1260 of FIG. 12 is greater than modified pulse count 1245 of FIG. 12. In one embodiment signals 1310 and 1320 are generated by comparator 1255 of FIG. 12.

Signal 1310 is input to a first logic function, e.g., AND-gate 1330, as well as clock signal $\overline{CLK}$. Signal 1320 is input to a second logic function, e.g., AND-gate 1340, as well as clock signal CLK. The outputs of the first logic function, e.g., AND-gate 1330, and the second logic function, e.g., AND-gate 1340, are input to a third logic function, e.g., OR-gate 1350. An output of the third logic function, e.g., OR-gate 1350, is the above disclosed CSD detection signal, e.g., CSD signal 1280 of FIG. 12, which is indicative that a clock signal has slowed (i.e., the duration of a subsequent phase of the clock signal is greater than the previous phase).

Figure 14:
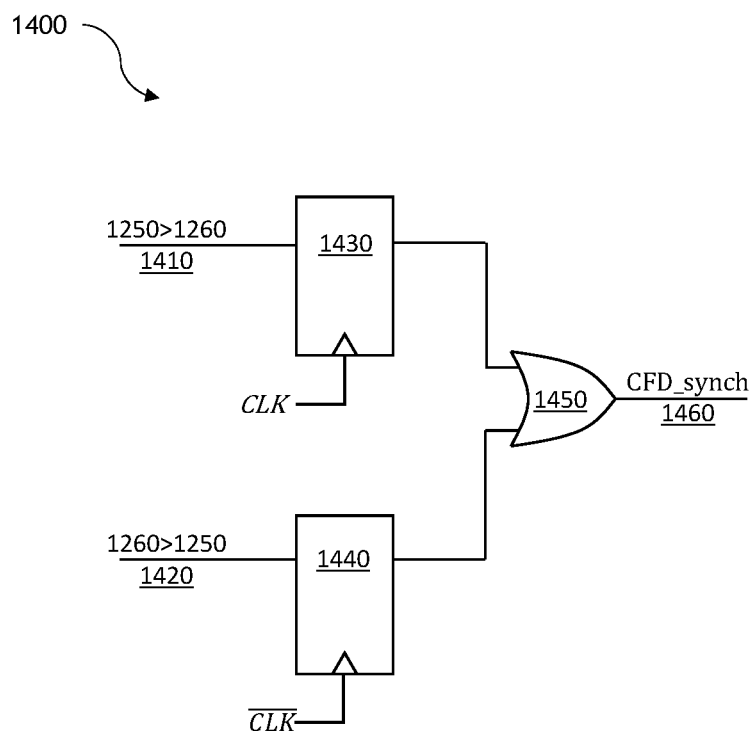
FIG. 14 illustrates an embodiment of synchronized clock fast detect (CFD) signal generation circuitry of the CAD.

FIG. 14 illustrates block diagram 1400 of an embodiment of synchronized CFD signal generation circuitry to generate, e.g., CFD_synch signal 1285 of FIG. 12. Furthermore, in some embodiments, CFD detection circuitry 1275 of FIG. 12 includes synchronized CFD signal generation circuitry 1400 of FIG. 14. In one embodiment of synchronized CFD signal generation circuitry 1400, two signals are input to synchronized CFD signal generation circuitry 1400. One signal, e.g., signal 1410, indicates that modified pulse count 1250 is greater than subsequent pulse count 1260 (which is indicative that a duration of a low phase of a clock signal, e.g., clock signal CLK is greater than a duration of high phase of an inverse clock signal, e.g., clock signal $\overline{CLK}$). Another signal input to synchronized CFD signal generation circuitry 1400, e.g., signal 1420 indicates that subsequent pulse count 1260 is greater than modified pulse count 1250 (which is indicative that a duration of a high phase of clock signal $\overline{CLK}$ is greater than a duration of a low phase of clock signal CLK). In one embodiment, signals 1410 and 1420 are generated by comparator 1265 of FIG. 12.

Signal 1410 is input to a first logic function, e.g., D-type flip-flop 1430, as well as clock signal CLK. Signal 1420 is input to a second logic function, e.g., D-type flip-flop 1440, as well as clock signal $\overline{CLK}$. The outputs of the first logic function, e.g., D-type flip-flop 1430, and the second logic function, e.g., D-type flip-flop 1440, are input to a third logic function, e.g., OR-gate 1450. An output of the third logic function, e.g., OR-gate 1450, is the above disclosed CFD_synch signal which is indicative that a clock signal has sped up (i.e., the duration of a subsequent phase of the clock signal is shorter than the previous phase).

Figure 15:
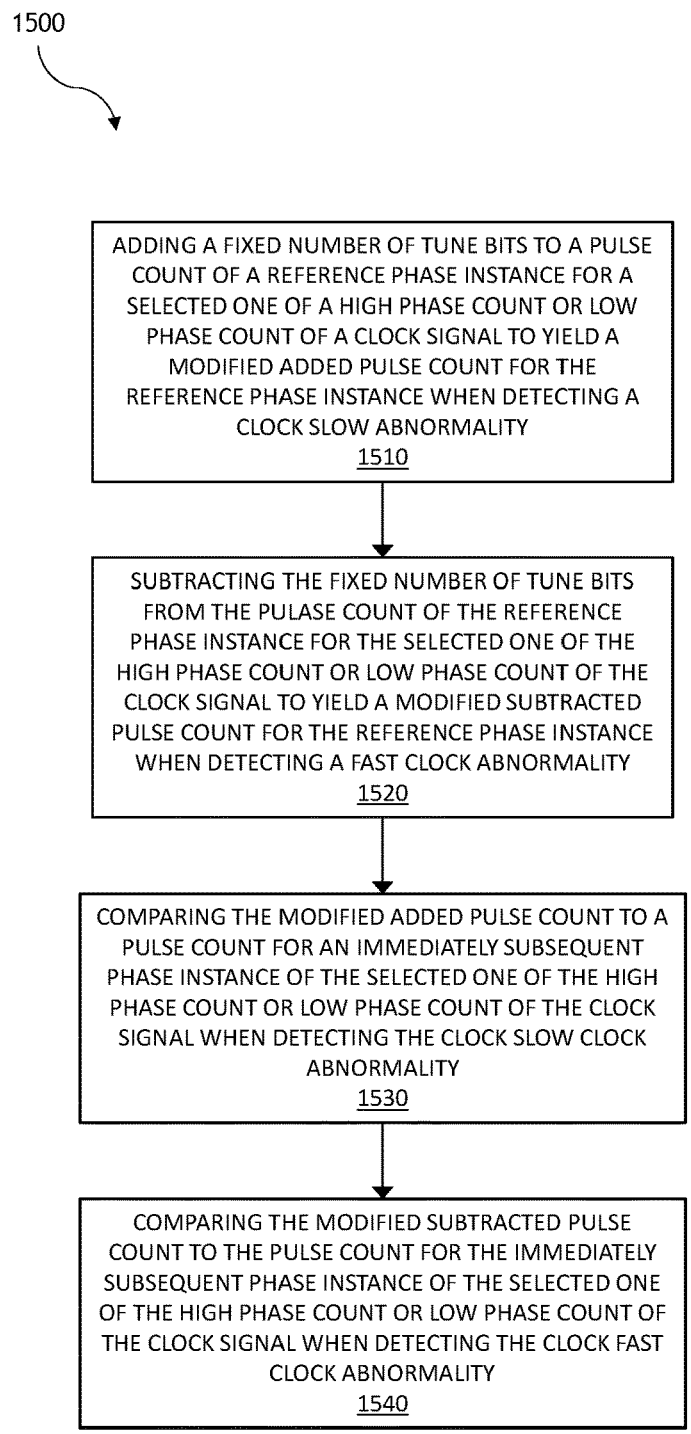
FIG. 15 illustrates a flow diagram of an example method for generating a CAD signal for a clock signal with a clock uncertainty.

FIG. 15 illustrates flow diagram 1500 of an example method for monitoring a clock signal with phase-to-phase variation input to a clock monitoring circuit according to principles of the disclosure. In step 1510 a fixed number of tune bits are added to a pulse count of a reference phase instance for a selected one of a high phase count or low phase count of a clock signal to yield a modified added pulse count for the reference phase instance when detecting a clock slow abnormality. In step 1520 the fixed number of tune bits are subtracted from the pulse count of the reference phase instance for the selected one of the high phase count or low phase count of the clock signal to yield a modified subtracted pulse count for the reference phase instance when detecting a clock fast clock abnormality. In step 1530, the modified added pulse count is compared to a pulse count for an immediately subsequent phase instance of the selected one of the high phase count or low phase count of the clock signal when detecting the clock slow clock abnormality. In step 1540, the modified subtracted pulse count is compared to the pulse count for the immediately subsequent phase instance of the selected one of the high phase count or low phase count of the clock signal when detecting the clock fast clock abnormality.

What is claimed is:

1. A clock monitoring circuit for monitoring a clock signal having phase-to-phase variation, comprising:
a binary adder configured to add a fixed number of tune bits to a pulse count of a reference phase instance for a selected one of a high phase count or low phase count of the clock signal to yield a modified added pulse count for the reference phase instance when detecting a clock slow clock abnormality;
a binary subtractor configured to subtract the fixed number of tune bits from the pulse count of the reference phase instance for the selected one of the high phase count or low phase count of the clock signal to yield a modified subtracted pulse count for the reference phase instance when detecting a clock fast clock abnormality;
a first comparator configured to compare the modified added pulse count to a pulse count for an immediately subsequent phase instance of the selected one of the high phase count or low phase count of the clock signal when detecting the clock slow clock abnormality;
a second comparator configured to compare the modified subtracted pulse count to the pulse count for the immediately subsequent phase instance of the selected one of the high phase count or low phase count of the clock signal when detecting the clock fast clock abnormality;
two ring pulse generators, each configured to generate a train of pulses corresponding to a duration of respective phases of the clock signal; and
two n-bit counters, each connected to a respective one of the two ring pulse generators, configured to count a number of pulses in respective pulse trains generated by the two ring pulse generators, wherein a count of the number of pulses in each respective pulse train is indicative of a duration of the respective phases of the clock signal.

2. The clock monitoring circuit as recited in claim 1, further comprising:
   clock slow detection (CSD) circuitry configured to assert a CSD signal when the modified added pulse count for the reference phase is less than the pulse count for the immediately subsequent phase instance of the selected one of the high phase count or low phase count of the clock signal;
   clock fast detection (CFD) circuitry configured to assert a CFD_synch signal with the modified subtracted pulse count for the reference phase is greater than the pulse count for the immediately subsequent phase instance of the selected one of the high phase count or low phase count of the clock signal; and
   a logic function configured to assert a clock abnormality detect (CAD) signal when either the CSD or CFD_synch signal are asserted.

3. The clock monitoring circuit as recited in claim 1, wherein the two ring pulse generators each comprise a plurality of edge detector circuits implemented in a ring delay arrangement wherein an output of a last of the plurality of edge detector circuits is fed back to an input of a first of the plurality of edge detector circuits.

4. The clock monitoring circuit as recited in claim 3, wherein:
   a first edge detector circuit of the plurality of edge detector circuits of a first ring pulse generator detects a first edge of the clock signal monitored by the clock monitoring circuit and outputs a pulse with a unit pulse width to a subsequent edge detector circuit of the plurality of edge detector circuits; and
   when the subsequent edge detector circuit detects an edge of the pulse output by the first edge detector, the subsequent edge detector outputs a pulse with the unit pulse width to another subsequent edge detector circuit of the plurality of edge detector circuits of the first ring pulse generator.

5. The clock monitoring circuit as recited in claim 4, wherein:
   the first edge of the clock signal monitored by the clock monitoring circuit is a falling edge; and
   an edge of the pulse output by the first edge detector detected by subsequent edge detector circuits are a falling edge.

6. The clock monitoring circuit as recited in claim 3, wherein the unit pulse width output by the plurality of edge detectors for both the first and second ring pulse generators is a same pulse width.

7. The clock monitoring circuit as recited in claim 1, wherein:
   separate n-bit counters are reset at a beginning of each of their respective separate phases of the clock signal; and
   the resetting is delayed until after a last pulse is counted for each of the respective phases of the clock signal.

8. An integrated circuit (IC), comprising:
   at least one processing subsystem; and
   at least one clock monitoring circuit for monitoring a clock signal having phase-to-phase variation coupled to the at least one processing subsystem and a clock signal externally generated from the IC or a plurality of clock signals generated internal to the IC, wherein the at least one clock monitoring circuit comprises:
   a binary adder configured to add a fixed number of tune bits to a pulse count of a reference phase instance for a selected one of a high phase count or low phase count of the clock signal to yield a modified added pulse count for the reference phase instance when detecting a clock slow clock abnormality;
   a binary subtractor configured to subtract the fixed number of tune bits from the pulse count of the reference phase instance for the selected one of the high phase count or low phase count of the clock signal to yield a modified subtracted pulse count for the reference phase instance when detecting a clock fast clock abnormality;
   a first comparator configured to compare the modified added pulse count to a pulse count for an immediately subsequent phase instance of the selected one of the high phase count or low phase count of the clock signal when detecting the clock slow clock abnormality;
   a second comparator configured to compare the modified subtracted pulse count to the pulse count for the immediately subsequent phase instance of the selected one of the high phase count or low phase count of the clock signal when detecting the clock fast clock abnormality;
   two ring pulse generators, each configured to generate a train of pulses corresponding to a duration of respective phases of the clock signal; and
   two n-bit counters, each connected to a respective one of the two ring pulse generators, configured to count a number of pulses in respective pulse trains generated by the two ring pulse generators wherein a count of number of pulses in each respective pulse train is indicative of a duration of the respective phases of the clock signal.

9. The IC as recited in claim 8, further comprising:
   clock slow detection (CSD) circuitry configured to assert a CSD signal when the modified added pulse count for the reference phase is less than the pulse count for the immediately subsequent phase instance of the selected one of the high phase count or low phase count of the clock signal;
   clock fast detection (CFD) circuitry configured to assert a CFD_synch signal with the modified subtracted pulse count for the reference phase is greater than the pulse count for the immediately subsequent phase instance of the selected one of the high phase count or low phase count of the clock signal; and
   a logic function configured to assert a clock abnormality detect (CAD) signal when either the CSD or CFD_synch signal are asserted.

10. The IC as recited in claim 8, further comprising phase-locked loop circuits (PLLs) that generate the plurality of clock signals generated internal to the IC.

11. The IC as recited in claim 8, wherein the at least one processing subsystem includes one or more central processing units (CPUs), one or more graphics processing units (GPUs), or one or more memory controllers.

12. The IC as recited in claim 9, wherein at least some of the at least one processing subsystem reset upon generation of the CAD signal by the clock monitoring circuit.

13. The IC as recited in claim 9, wherein at least some of the at least one processing subsystem log instances of instances of the CAD signal by the clock monitoring circuit.

14. A method of operating a clock monitoring circuit for monitoring a clock signal having phase-to-phase variation, comprising:

adding a fixed number of tune bits to a pulse count of a reference phase instance for a selected one of a high phase count or low phase count of the clock signal to yield a modified added pulse count for the reference phase instance when detecting a clock slow clock abnormality;

subtracting the fixed number of tune bits from the pulse count of the reference phase instance for the selected one of the high phase count or low phase count of the clock signal to yield a modified subtracted pulse count for the reference phase instance when detecting a clock fast clock abnormality;

comparing the modified added pulse count to a pulse count for an immediately subsequent phase instance of the selected one of the high phase count or low phase count of the clock signal when detecting the clock slow clock abnormality;

comparing the modified subtracted pulse count to the pulse count for the immediately subsequent phase instance of the selected one of the high phase count or low phase count of the clock signal when detecting the clock fast clock abnormality;

generating a train of pulses corresponding to a duration of respective phases of the clock signal; and counting a number of pulses in respective pulse trains, wherein a count of the number of pulses in each respective pulse train is indicative of a duration of the respective phases of the clock signal.

15. The method as recited in claim 14, further comprising:

asserting a clock slow detect signal when the modified added pulse count for the reference phase is less than the pulse count for the immediately subsequent phase instance of the selected one of the high phase count or low phase count of the clock signal;

asserting a CFD_synch signal when the modified subtracted pulse count for the reference phase is greater than the pulse count for the immediately subsequent phase instance of the selected one of the high phase count or low phase count of the clock signal; and asserting a clock abnormality detect (CAD) signal when either the CSD or CFD_synch signal are asserted.

16. A method of manufacturing an integrated circuit (IC) for monitoring a clock signal having phase-to-phase variation, comprising forming:

a binary adder configured to add a fixed number of tune bits to a pulse count of a reference phase instance for a selected one of a high phase count or low phase count of the clock signal to yield a modified added pulse count for the reference phase when detecting a clock slow clock abnormality;

a binary subtractor configured to subtract the fixed number of tune bits to the pulse count of the reference phase instance for the selected one of the high phase count or low phase count of the clock signal to yield a modified subtracted pulse count for the reference phase when detecting a clock fast clock abnormality;

a first comparator configured to compare the modified added pulse count to a pulse count for an immediately subsequent phase instance of the selected one of the high phase count or low phase count of the clock signal when detecting the clock slow clock abnormality;

a second comparator configured to compare the modified subtracted pulse count to the pulse count for the immediately subsequent phase instance of the selected one of the high phase count or low phase count of the clock signal when detecting the clock fast clock abnormality;

two ring pulse generators, each configured to generate a train of pulses corresponding to a duration of respective phases of the clock signal; and two n-bit counters, each connected to a respective one of the two ring pulse generators, configured to count a number of pulses in respective pulse trains generated by the two ring pulse generators, wherein a count of the number of pulses in each respective pulse train is indicative of a duration of the respective phases of the clock signal.

17. The method as recited in claim 16, further comprising forming:

clock slow detection (CSD) circuitry configured to assert a CSD signal when the modified added pulse count for the reference phase is less than the pulse count for the immediately subsequent phase instance of the selected one of the high phase count or low phase count of the clock signal;

clock fast detection (CFD) circuitry configured to assert a CFD_synch signal with the modified subtracted pulse count for the reference phase is greater than the pulse count for the immediately subsequent phase instance of the selected one of the high phase count or low phase count of the clock signal; and a logic function configured to assert a clock abnormality detect (CAD) signal when either the CSD or CFD_synch signal are asserted.

18. An autonomous machine, comprising:

at least one processing subsystem; and at least one clock monitoring circuit for monitoring a clock signal having phase-to-phase variation coupled to the at least one processing subsystem and an externally generated clock signal or a plurality of internally generated clock signals, wherein the clock monitoring circuit comprises:

a binary adder configured to add a fixed number of tune bits to a pulse count of a reference phase instance for a selected one of a high phase count or low phase count of the clock signal to yield a modified added pulse count for the reference phase instance when detecting a clock slow clock abnormality;

a binary subtractor configured to subtract the fixed number of tune bits from the pulse count of the reference phase instance for the selected one of the high phase count or low phase count of the clock signal to yield a modified subtracted pulse count for the reference phase instance when detecting a clock fast clock abnormality;

a first comparator configured to compare the modified added pulse count to a pulse count for an immediately subsequent phase instance of the selected one of the high phase count or low phase count of the clock signal when detecting the clock slow clock abnormality;

a second comparator configured to compare the modified subtracted pulse count to the pulse count for the immediately subsequent phase instance of the selected one of the high phase count or low phase count of the clock signal when detecting the clock fast clock abnormality;

two ring pulse generators, each configured to generate a train of pulses corresponding to a duration of respective phases of the clock signal; and two n-bit counters, each connected to a respective one of the two ring pulse generators, configured to count a number of pulses in respective pulse trains generated by the two ring pulse generators, wherein a count of the number of pulses in each respective pulse train is indicative of a duration of the respective phases of the clock signal.

19. The autonomous machine as recited in claim 18, further comprising:
   clock slow detection (CSD) circuitry configured to assert a CSD signal when the modified added pulse count for the reference phase is less than the pulse count for the immediately subsequent phase instance of the selected one of the high phase count or low phase count of the clock signal;
   clock fast detection (CFD) circuitry configured to assert a CFD_synch signal with the modified subtracted pulse count for the reference phase is greater than the pulse count for the immediately subsequent phase instance of the selected one of the high phase count or low phase count of the clock signal; and
   a logic function configured to assert a clock abnormality detect (CAD) signal when either the CSD or CFD_synch signal are asserted.

20. The autonomous machine as recited in claim 19, wherein the autonomous machine logs instances of the CAD signal.

21. The autonomous machine as recited in claim 19, wherein some of the at least one of the processing subsystem reset based on the logged instances of the CAD signal.

22. The autonomous machine as recited in claim 18, wherein the autonomous machine is an autonomous driving computing platform.

23. The autonomous machine as recited in claim 18, wherein the autonomous machine is robotic computing platform.

* * * * *